United States Patent
Poppe

(10) Patent No.: US 6,918,280 B2
(45) Date of Patent: Jul. 19, 2005

(54) WORKPIECE EJECTOR AND TRANSFER APPARATUS

(76) Inventor: Michael F. Poppe, 9803 Meskill Rd., Columbus, MI (US) 48063

( * ) Notice: Subject to any disclaimer, the term of this patent is extended or adjusted under 35 U.S.C. 154(b) by 57 days.

(21) Appl. No.: 10/418,451

(22) Filed: Apr. 17, 2003

(65) Prior Publication Data

US 2004/0206153 A1 Oct. 21, 2004

(51) Int. Cl.$^7$ .............................................. B21D 45/00
(52) U.S. Cl. ........................... 72/426; 72/427; 100/218; 83/157
(58) Field of Search ......................... 72/420, 421, 422, 72/426, 427; 100/351, 218; 83/109, 111, 112, 157, 165; 414/224.01, 225.01

(56) References Cited

U.S. PATENT DOCUMENTS

| | | | |
|---|---|---|---|
| 2,969,750 A | | 1/1961 | Clark |
| 3,349,602 A | * | 10/1967 | Nelson ......................... 72/426 |
| 3,648,821 A | | 3/1972 | Rudolph et al. |
| 4,242,900 A | * | 1/1981 | Dixon ......................... 72/345 |
| 4,625,853 A | | 12/1986 | Gregg |
| 4,779,336 A | | 10/1988 | Inoue et al. |
| 4,846,056 A | * | 7/1989 | Bond ......................... 100/281 |
| 4,961,337 A | * | 10/1990 | Henning et al. ............... 72/426 |
| 5,141,093 A | | 8/1992 | Alexander |
| 5,572,926 A | * | 11/1996 | Bachhuber ................... 100/35 |
| 5,924,545 A | | 7/1999 | Crorey |
| 6,301,949 B1 | * | 10/2001 | Beddoe et al. ................ 72/420 |

* cited by examiner

*Primary Examiner*—Ed Tolan
(74) *Attorney, Agent, or Firm*—VanOphem & VanOphem P.C.

(57) ABSTRACT

A workpiece ejector and transfer apparatus adapted to automatically extract a workpiece from a tool after work has been performed, and thereby reduce the cycle time for the operation. The apparatus includes a cylinder, a pair of cam plates adapted to convert the reciprocating motion of the cylinder into a rotational motion, and an engagement portion adapted to engage and unload the workpiece. When the cylinder is actuated, the cam plates are initially translated in an upward direction, and thereafter rotated. The initial upward translation of the cam plates is intended to engage and lift a processed workpiece such that it has sufficient clearance from its tool, whereas the rotation of the cam plates acts to transfer the processed workpiece such that the tool can accommodate a new workpiece. The processed workpiece is preferably transferred to a temporary retaining device while the new workpiece is loaded.

13 Claims, 4 Drawing Sheets

WORKPIECE EJECTOR AND TRANSFER APPARATUS

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention is directed to a workpiece ejector and transfer apparatus adapted to automatically eject a processed workpiece from a tool and transfer the processed workpiece to an unload position such that a new workpiece can immediately be loaded into the tool and thereby reduce cycle time. The workpiece ejector and transfer apparatus is compact and inexpensive as compared to the use of a robot, and thereby provides increased efficiency as well as reduced congestion of the manufacturing space.

The workpiece ejector and transfer apparatus is particularly adapted to synchronous manufacturing operations wherein a single operator runs multiple tools that are typically arranged in a carousel type configuration. Conventional synchronous manufacturing operations require the operator to manually unload and transfer the processed workpiece to a storage position before a new workpiece can be loaded into the tool and work can be performed. Accordingly, the efficiency can be improved by automatically unloading the tool thereby eliminating the down time during which the processed workpiece is manually unloaded and transferred. Furthermore, the synchronous manufacturing operation can be coordinated to optimize the efficiency of the operator such that a single operator can load and unload multiple tools. While the preferred embodiment of the present invention relates to a welding application, it should be appreciated that the invention may be adapted to accommodate any number of alternate applications.

2. Description of the Related Art

Inoue et al., U.S. Pat. No. 4,779,336 teaches an apparatus for positioning a body panel assembly wherein a swingable platform is supported for swing motion at one end of the slide base which is moved back and forth by a programmable high precision positioning mechanism, such as a servo or pulse motor. The platform having a jig pallet clamped thereto is rotated such that the part held by the pallet may take an assembly attitude and the slide base is moved to transfer the part to a position for assembly to a body. Inoue et al. however, does not provide an apparatus for automatically extracting the workpiece from a tool after work has been performed, such that the workpiece must be unloaded from the tool before work can be performed on another workpiece.

Clark, U.S. Pat. No. 2,969,750 teaches an apparatus for loading and unloading a plating rack from a conveying system. The apparatus includes a pair of transfer devices associated with a shop conveyor and a plating machine having a hydraulic loader. The hydraulic loader includes a hydraulic cylinder and a pair of telescoping arm assemblies that are each pivotally secured at their lower end to a base and attached at their upper end to a central portion of a frame. The Clark invention is, however, limited to loading and unloading a workpiece that is transported by a trolley along the conveyor, and is not adapted to unload a stationary workpiece from a fixed tool. Additionally, the composition of the Clark invention is excessively complex and therefore likely to be expensive and prone to failure.

Rudolph et al., U.S. Pat. No. 3,648,821 teaches an apparatus for transferring workpieces from a first to second location while simultaneously changing the orientation of the workpiece. The invention includes a first transferring apparatus adapted to load a new workpiece and a second transferring apparatus adapted to unload a processed workpiece. The first and second transferring apparatus are located adjacent an endless conveyor having a plurality of uniformly spaced supporting devices. As with the Clark reference described hereinabove, Rudolph et al. is limited to loading and unloading a workpiece that is transported by a supporting device along a conveyor, and is not adapted to unload a stationary workpiece from a fixed tool.

Alexander, U.S. Pat. No. 5,141,093 teaches an apparatus for conveying body panels to and from a workstation along the conveyor using appropriate releasable clamps to retain the panel engaged against the locator pads of the support frame. The apparatus includes a support frame adapted to be mounted along one edge upon the carrier of a conveyor. A number of locating and retaining devices or clamps are mounted at predetermined locations on the support frame such that the work piece is adequately located and retained. The conveyor is provided with a manipulator assembly adapted to pivot the support frame from a generally horizontal conveying position to and from a lowered position where the support frame is adjacent a panel receiving frame. As the Alexander reference is adapted to precisely load a workpiece into a tool and thereafter unload the workpiece, it is unnecessarily complicated and expensive for purposes of unloading a workpiece that was manually loaded. Many of the features of the Alexander reference, such as the support frame with locators and clamps, are provided to precisely load the workpiece into the tool, and in the context of an operation, that exclusively unloads the workpiece, such features are redundant and/or completely useless.

From the above, it can be appreciated that the workpiece ejector and transfer devices of the prior art are not fully optimized. Therefore, what is needed is a simple and inexpensive device adapted to unload a processed workpiece that is either stationary or conveyed along an assembly line, and thereafter transfer the processed workpiece to an unload position while a new workpiece is processed through the tool.

BRIEF SUMMARY OF THE INVENTION

According to the preferred embodiment of the present invention, there is provided a method and apparatus for ejecting and transferring a workpiece. More precisely, the invention discloses a method and apparatus for automatically ejecting a processed workpiece from a tool and transferring the processed workpiece to an unload position while a new workpiece is loaded into the tool such that the overall cycle time of the operation is reduced. The apparatus includes a cylinder assembly, a pair of cam plates adapted to convert the reciprocating motion of the cylinder assembly into a rotational motion, and an engagement portion adapted to engage and unload the workpiece.

The cylinder assembly may be actuated by any conventional apparatus such as pneumatics or hydraulics, and includes a body portion and a piston rod that is mounted in the body portion of the cylinder and extends therefrom. The extended end of the piston rod has a pair of oppositely disposed drive rollers attached thereto. The cylinder is rigidly mounted to a vertical mounting plate that is in turn attached to an angle plate. The mounting plate preferably has a plurality of fixed rollers attached near an uppermost end thereof. According to the preferred embodiment, an intermediate plate member is disposed between the mounting plate and the riser to provide clearance for the cylinder.

The cam plates are mounted to an angle bracket disposed therebetween such that the cam plates are spaced apart and are generally parallel to each other. The cam plates have a symmetrical configuration of slots therethrough, which are oriented to facilitate the conversion of the reciprocating motion of the cylinder into translational and rotational or pivotal motion. A first slot is generally horizontal and is adapted to accommodate one of the drive rollers mounted on the piston rod. A second generally vertical slot is adapted to accommodate one of the fixed rollers of the mounting plate. Additional slots adapted to accommodate additional fixed rollers may be implemented to provide stability as required for a specific application.

When the workpiece ejector and transfer apparatus is in its steady state position, the drive rollers are positioned near the rearward most portion of the first slots and the fixed rollers are positioned near the top portion of the second slots. When the cylinder is actuated, the piston rod and drive rollers extend in an upward direction. The drive rollers translate the cam plates upward until the fixed rollers reach the bottom of their respective second slots. Thereafter, additional extension of the piston rod acts to rotate the cam plates about the fixed rollers bottomed out in their respective slots. The initial upward translation of the cam plates is intended to engage and lift a processed workpiece such that it has enough clearance to enable its ejecting from the tool, whereas the rotation of the cam plates acts to transfer the processed workpiece to a storage position such that the tool can receive a new workpiece.

The engagement portion of the workpiece ejector and transfer apparatus is preferably mounted to the angle bracket, and is intended to be adaptable to accommodate a variety of different applications. In one embodiment, a plurality of adjustable ejector rails are positioned relative to a region of the tool having adequate clearance such that the ejector rails can engage accessible portions of the processed workpiece.

It is an object of the present invention to provide a workpiece ejector apparatus adapted to automatically unload a processed workpiece from a tool to make room for new workpiece such that the tool can be reloaded immediately after work is performed thereby reducing the downtime of the tool and the overall cycle time of the operation.

It is another object that an apparatus of the present invention be simple and economical.

It is still another object that an apparatus of the present invention be configured to unload a workpiece individually loaded into a tool one at a time, and that such an apparatus also be configured to unload a workpiece being transferred along an assembly line.

It is yet another object that an apparatus of the present invention transfer the processed workpiece to an unload position such the operator can immediately load a new workpiece and transfer the processed workpiece from the temporary position while the new workpiece is being processed and without delaying the operation of the tool.

It is a further object that an apparatus of the present invention be implemented in a synchronous manufacturing operation to increase the efficiency thereof.

It is still a further object that an apparatus of the present invention be implemented in a synchronous manufacturing operation to enable a single operator to load and unload more tools than would otherwise be possible.

It is yet a further object that an apparatus of the present invention be compact such that it occupies minimal manufacturing space.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
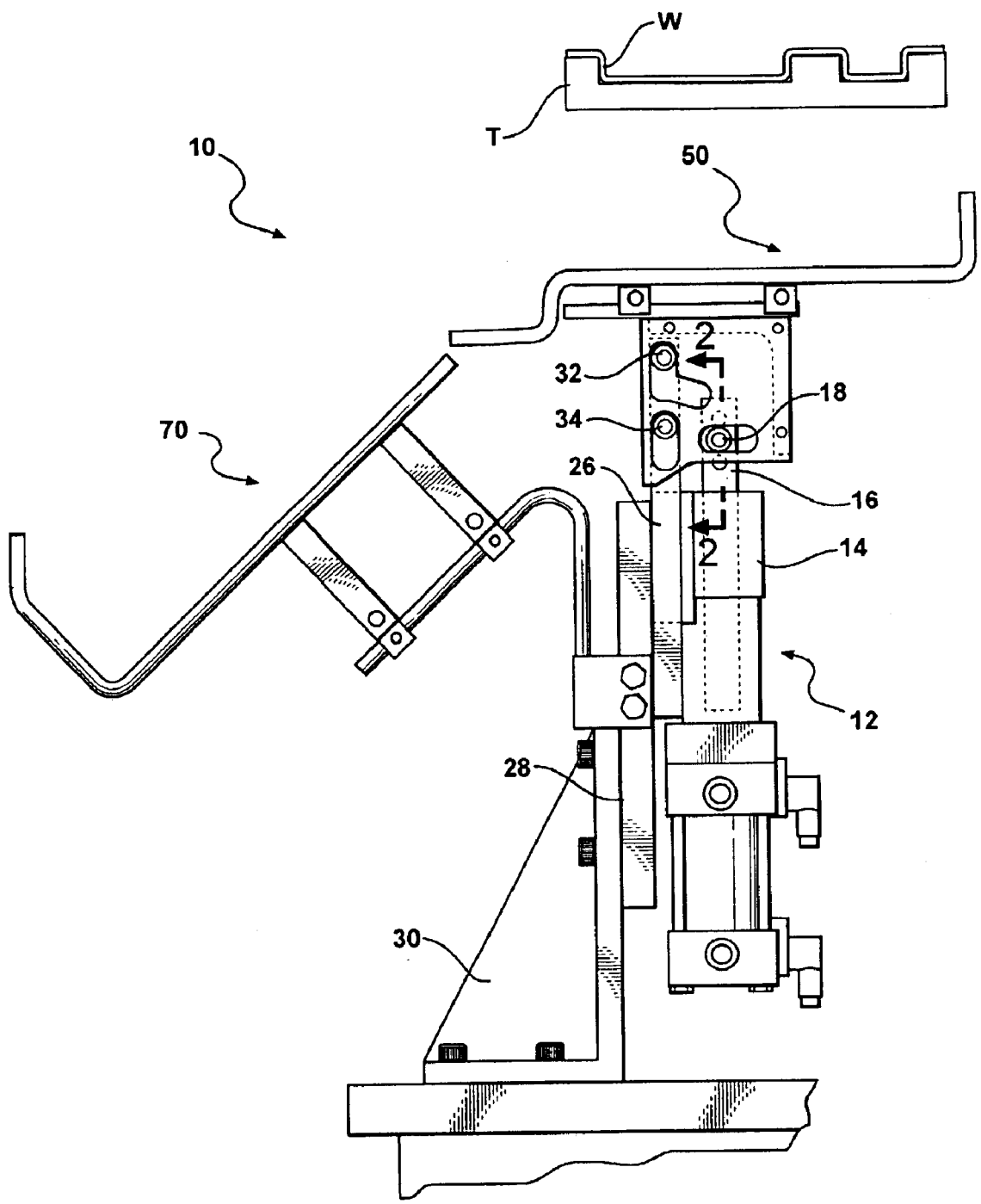
FIG. 1 is a side view of an apparatus according to the preferred embodiment of the present invention shown in its steady state position.

Referring now in detail to the Figures, there is shown in FIG. 1 a workpiece ejector and transfer apparatus 10 that is constructed in accordance with the present invention. The workpiece ejector and transfer apparatus 10 is adapted to automatically unload a processed workpiece W from a tool T to make room for a new workpiece (not shown) such that the tool T can be re-loaded immediately after work is performed thereby reducing the downtime of the tool and the overall cycle time of the operation. After the tool T is unloaded, the processed workpiece W is preferably transferred to an unload position while the new workpiece is loaded. According to the preferred embodiment of the present invention, the apparatus includes a cylinder assembly 12, a pair of cam plates 36, 38 (shown in FIG. 3) adapted to convert the reciprocating motion of the cylinder into a rotational motion of the pair of cam plates 36, 38, an engagement portion 50 having ejector rails 56 (shown in FIG. 4) adapted to engage and unload the processed workpiece W, and a temporary retaining device 70 adapted to temporarily retain the processed workpiece W while the new workpiece is loaded into the tool T.

In the context of the following detailed description of the preferred embodiment, reference to the X, Y and Z coordinate axes, as well the relative terms forward/rearward (X), above/below (Y), and right/left (Z) should be applied from the perspective of an operator (not shown) using the workpiece ejector and transfer apparatus 10 as viewed in FIG. 4.

Figure 2:
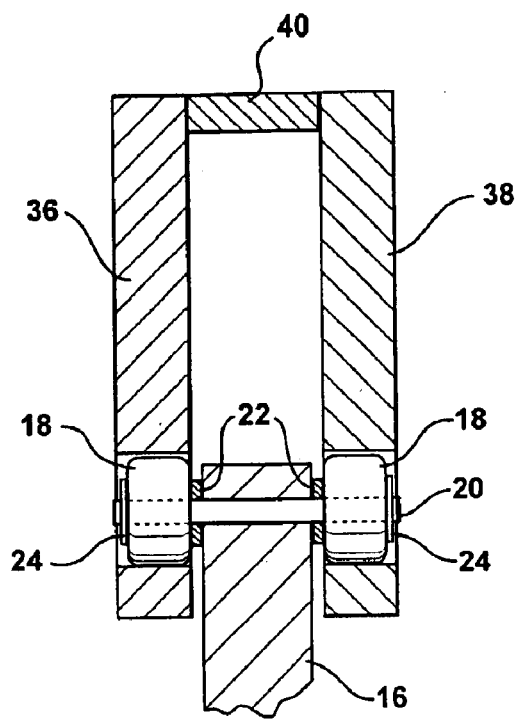
FIG. 2 is a cross-sectional view taken along line 2—2 of FIG. 1.

The cylinder assembly 12 may be hydraulically or pneumatically actuated, and includes a body portion 14 and a piston rod 16 that may be extended from and retracted into the body portion 14. The piston rod 16 is generally rectangular or circular and has a pair of oppositely disposed drive rollers 18 attached to an exposed end portion of the piston rod 16. Referring specifically to FIG. 2, a section through the drive rollers 18 shows that the drive rollers 18 are mounted to each end of an axle pin 20 that is disposed in a hole (not shown) through the piston rod 16. Spacers 22 are provided to maintain separation between the drive rollers 18 and piston rod 16, and cotter pins 24 retain the drive rollers 18 on the axle pin 20.

Referring again to FIG. 1, the cylinder assembly 12 is rigidly mounted to a vertical mounting plate 26 that is in turn attached to an angle plate 30. According to the preferred embodiment, an intermediate plate member 28 is disposed between the vertical mounting plate 26 and the angle plate 30 to provide clearance for the cylinder assembly 12, however it should be appreciated that the intermediate plate member 28 may be unnecessary in some applications. The vertical mounting plate 26 preferably includes a first pair of oppositely disposed fixed rollers 32 attached near an uppermost end thereof, and a second pair of oppositely disposed fixed rollers 34 attached below the first pair of fixed rollers 32. The fixed rollers 32, 34 are attached to the vertical mounting plate 26 in a manner similar to that disclosed hereinabove for the drive rollers 18, and accordingly each pair of fixed rollers 32, 34 includes an axle pin 20, spacers 22, and cotter pins 24 as arranged in FIG. 2. The angle plate 30 is commercially available in a variety of different configurations, and the height thereof is intended to vary depending upon the specific application.

Figure 3:
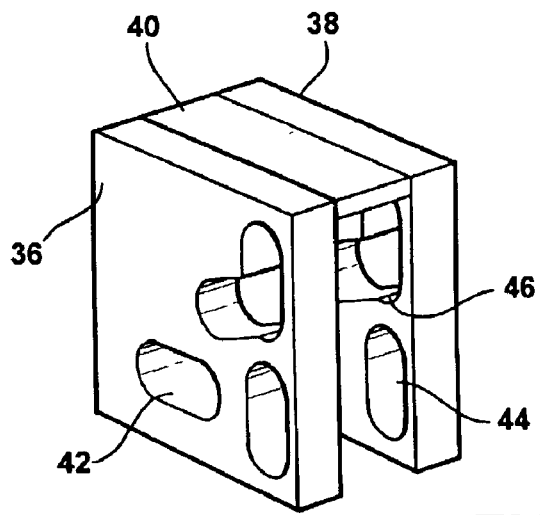
FIG. 3 is an isometric view of the cam plates of FIG. 1.
Figure 4:
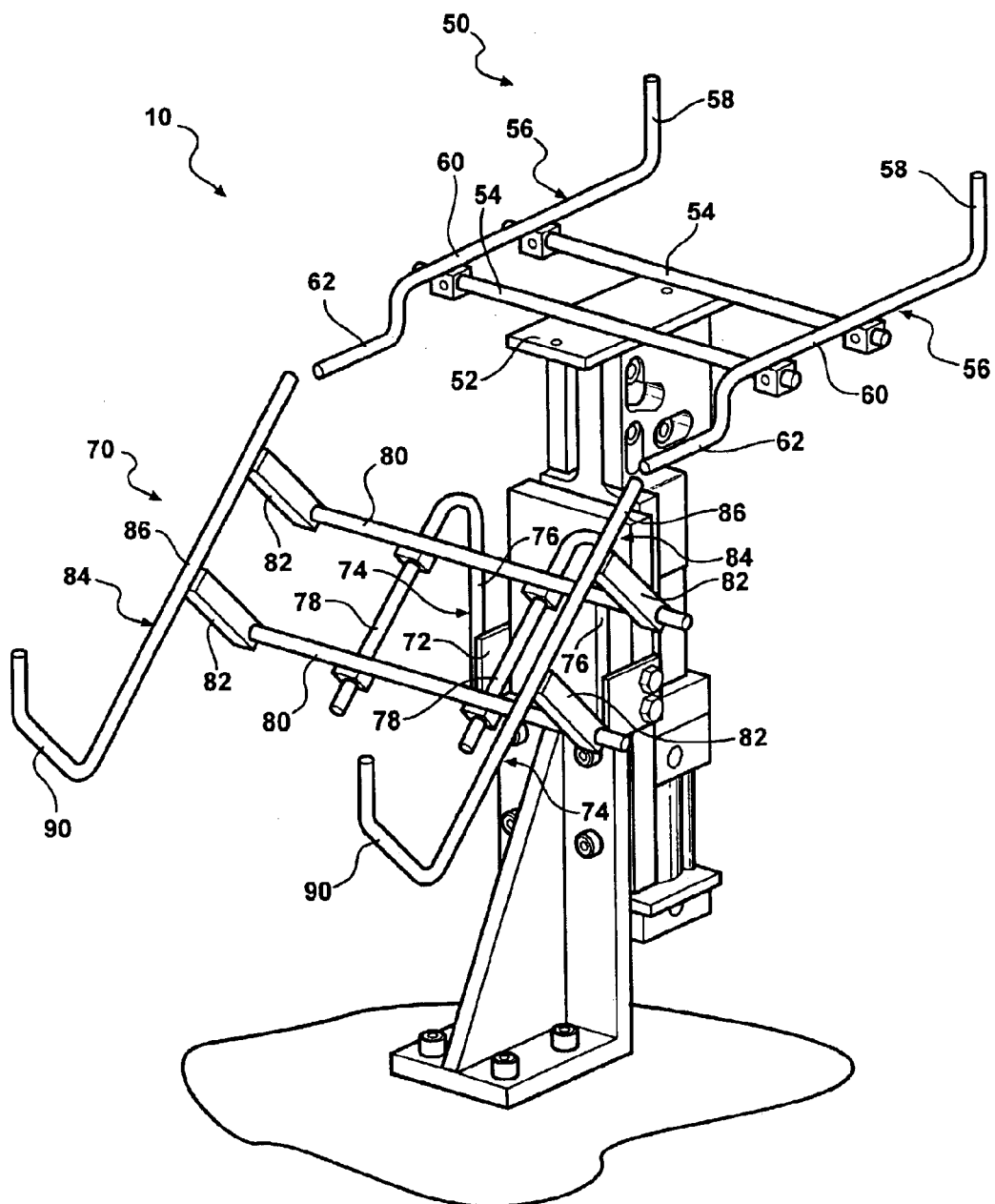
FIG. 4 is an isometric view of the apparatus of FIG. 1.

As seen in FIGS. 3 and 4, the pair of cam plates 36, 38 are mounted to an angle bracket 40 in any conventional way and are disposed therebetween such that the pair of cam plates 36, 38 are spaced apart a predetermined distance and are generally parallel to each other. The pair of cam plates 36, 38 each have a plurality of slots oriented to convert the reciprocating motion of the cylinder assembly 12 into a rotational motion each of the pair of cam plates 36, 38. The pair of cam plates 36, 38 will hereinafter be disclosed as having three slots arranged in a predetermined configuration which will be disclosed in detail hereinafter, however, it should be appreciated that alternative embodiments having fewer slots, additional slots and/or different slot configurations can be envisioned depending on the desired motion of the engagement portion 50.

A first slot 42 is generally horizontal and is located near the bottom center of each cam plate 36, 38. A second slot 44 is located rearward relative to the first slot 42, and vertically extends above the first slot 42 in a first direction and below the first slot 42 in an opposite direction. A third slot 46 is located above the second slot 44 and includes a first portion 44a that is vertical and is generally vertically aligned with the second slot 44, and a second portion 44b extending therefrom in a downward and forward direction. The third slot 46 is optional, but provides additional stability such that its incorporation is preferred.

Referring to FIGS. 3–4, one of the drive rollers 18 is disposed within the first slot 42 of the cam plate 36 and the other drive roller 18 is disposed within the first slot 42 of the cam plate 38. One roller of the first pair of fixed rollers 32 is disposed within the third slot 46 of the cam plate 36, the other roller of the first pair of fixed rollers 32 is disposed within the third slot 46 of the cam plate 38. One roller of the second pair of fixed rollers 34 is disposed within the second slot 44 of the cam plate 36, the other roller of the second pair of fixed rollers 34 is disposed within the second slot 44 of the cam plate 38. When the workpiece ejector and transfer apparatus 10 is in its steady state position, the drive rollers 18 are positioned near the rearward most portion of the first slots 42, the first pair of fixed rollers 32 are positioned near the top portion of the third slots 46, and the second pair of fixed rollers 34 are positioned near the top of second slots 44.

Figure 5:
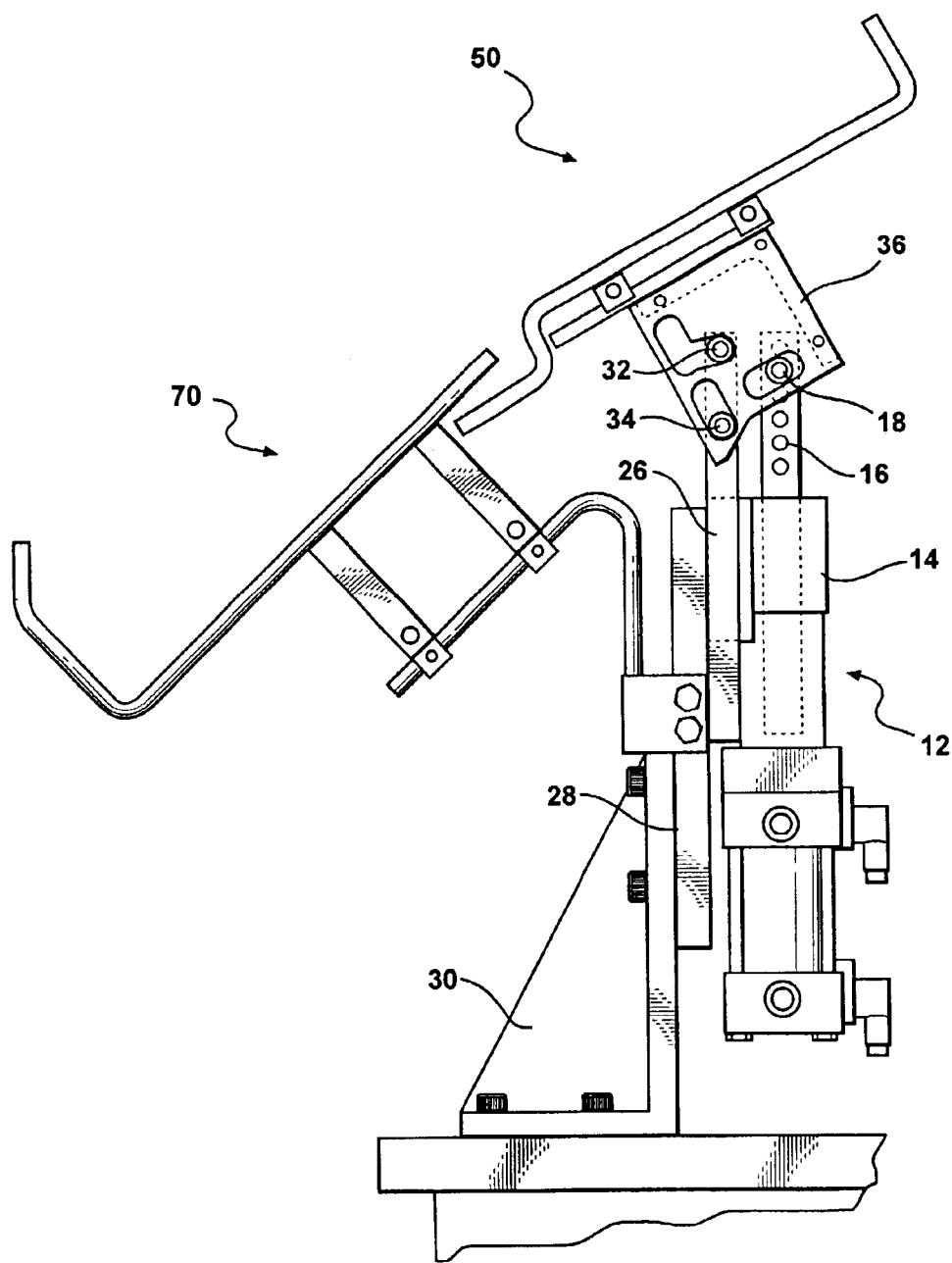
FIG. 5 is a side view of the apparatus of FIG. 1 shown in its eject position.

As shown in FIG. 5, when the cylinder assembly 12 is actuated, the piston rod 16 and drive rollers 18 extend in an upward direction. The drive rollers 18 translate the pair of cam plates 36, 38 upward until the second pair of fixed rollers 34 reach the bottom portion of their respective second slots 44. Thereafter, additional extension of the piston rod 16 acts to rotate the pair of cam plates 36, 38 in a counterclockwise direction about the bottom portion of their respective second slots 44 while the first pair of fixed rollers 32 follow their respective third slot 46. The initial upward translation of the pair of cam plates 36, 38 is intended to engage and lift a processed workpiece W (shown in FIG. 1) such that it has sufficient clearance from the tool T (shown in FIG. 1), whereas the rotation of the pair of cam plates 36, 38 acts to transfer the processed workpiece W such that the tool can accommodate a new workpiece (not shown).

Full upward extension of the piston rod 16 acts to rotate the pair of cam plates 36, 38 by approximately 30° which has been established to be an amount sufficient to ensure that gravity will overcome the frictional resistance between the processed workpiece W and the engagement portion 50 of the workpiece ejector and transfer apparatus 10 so that the processed workpiece W is transferred out of the way of the tool T thereby making room to load a new workpiece (not shown). If desirable, the amount of cam plate rotation can be reduced by reducing the stroke length of the cylinder assembly 12. This may be desirable, for instance, in an application involving an extremely heavy workpiece that would otherwise generate excessive momentum. Additionally, the engagement portion 50 may be coated with a material adapted to reduce friction and thereby further facilitate the transfer of the processed workpiece W.

Referring again to FIG. 4, the engagement portion 50 of the workpiece ejector and transfer apparatus 10 is mounted to the angle bracket 40 (shown in FIG. 3), and preferably includes a top plate 52 mounted to the angle bracket 40, a pair of mounting rails 54 and a pair of ejector rails 56. It should be appreciated that the engagement portion 50 of the workpiece ejector and transfer apparatus 10 is intended to be adaptable to accommodate a variety of different applications, and that the following disclosure merely represents a preferred embodiment of the present invention that should not be considered limiting.

The top plate 52 is mounted to the angle bracket 40 on top of the pair of cam plates 36, 38. The mounting rails 54 are attached to the top plate 52 and extend therefrom in both the positive and negative Z (right/left) directions. The ejector rails 56 are generally L-shaped, each includes a foot 58, and an ejector rail leg 60 extending therefrom that terminates in an offset portion 62. Each ejector rail leg 60 is adjustably attached to both mounting rails 54 such that the foot 58 is disposed in an upward and rearward direction therefrom, and the offset portion 62 is disposed in a downward and rearward direction therefrom.

The adjustable attachment of the ejector rails 56 provides locational adjustment in the Z (right/left) direction. The ejector rails 56 are adjustable so that they may be positioned relative to a region of the tool T with adequate clearance and thereby engage accessible portions of the processed workpiece W. It should be appreciated that the configuration of the engagement portion 50 disclosed hereinabove is merely one embodiment, and it is envisioned that the engagement portion 50 can be application specific. For example, the ejector rails 56 may be bent to clear tooling or fixturing structure and thereby engage the processed workpiece W without interference.

The preferred embodiment of the workpiece ejector and transfer apparatus 10 includes a temporary retaining device 70 for holding the processed workpiece W while the operator loads a new workpiece (not shown), however it should be appreciated by one of ordinary skill in the art that the workpiece ejector and transfer apparatus 10 may be implemented without the temporarily retaining device 70. The temporarily retaining device 70 is advantageous in that it allows an operator to load a new workpiece immediately after the processed workpiece W has been ejected and to transfer the processed workpiece W from the temporary retaining device 70 after the work cycle of the tool T has begun, which is clearly more efficient than a process requiring the operator to manually unload the processed workpiece W before a new workpiece can be loaded onto the tool T. In other words, the present invention requires less down time of the tool T in that the tool T can be performing work during the time otherwise allocated for manually unloading and transporting the processed workpiece W.

The temporary retaining device 70 is attached to the intermediate plate member 28 (shown in FIG. 1) and preferably includes a pair of spacer blocks 72, a pair of mounting rails 74, a pair of adjustment rails 80, two pair of adjustable spacers 82, and a pair of retention rails 84. The pair of spacer blocks 72 are rigidly mounted on opposite sides of the intermediate plate member 28 and extend therefrom in a rearward direction. The mounting rails 74 are generally V-shaped and include a first leg portion 76 and a second leg portion 78. The mounting rails 74 are attached to the workpiece ejector and transfer apparatus 10 in an inverted orientation such that the first leg portion 76 of each mounting rail is attached to one of the spacer blocks 72 and vertically extends therefrom in an upward direction terminating at the second leg portion 78 which extends therefrom in a rearward and downward direction.

The pair of adjustment rails 80 are each adjustably attached to both second leg portions 78 of the pair of mounting rails 74 and extend therefrom in both the positive and negative Z (right/left) directions. The adjustable attachment allows adjustment in the up/down and fore/aft directions along the second leg portion 78 of the mounting rails 74. A pair of adjustable spacers 82 are adjustably attached to each adjustment rail 80 such that the adjustable spacers 82 are adjustable in the Z (right/left) direction. Furthermore, the adjustable spacers 82 are available in a variety of configurations such that additional up/down and fore/aft adjustment is obtainable by selecting an appropriate length thereof.

The retention rails 84 are generally L-shaped and include a retention rail leg 86 having an exposed end portion, and a retention rail foot 90 also having an exposed end portion. Each retention rail leg 86 is rigidly attached to two adjustable spacers 82 such that the retention rails 84 are adjustable in the Z (right/left) direction along with the adjustable spacers 82. The exposed end portion of each retention rail leg 86 is located at an uppermost portion thereof, and the retention rail foot 90 is located at a lowermost portion of each retention rail leg 86. The retention rail foot 90 extends generally perpendicularly from the retention rail leg 86 in an upward and rearward direction.

The retention rail legs 86 are preferably aligned with the offset portion 62 of the ejector rail legs 60 such that when the piston rod 16 is in the fully extended position, the ejector rail offset portion 62 is disposed below the exposed end portion of the retention rail legs 86. Accordingly, the processed workpiece W is smoothly transferred from the ejector rail legs 60 to the retention rail legs 86 without encountering an appreciable interference therebetween. Thereafter the processed workpiece W is retained by the retention rail feet 90 and supported by the retention rail legs 86 until an operator transfers the processed workpiece W to another location after loading a new workpiece (not shown) to be processed.

While the present invention has been described in terms of a preferred embodiment, it is apparent that other forms could be adopted by one skilled in the art. In other words, the teachings of the present invention encompass any reasonable substitutions or equivalents of claim limitations. For example, the structure, materials, sizes, and shapes of the individual components could be modified, or substituted with other similar structure, materials, sizes, and shapes. Those skilled in the art will appreciate that other applications, including those outside of the automotive industry, are possible with this invention. Accordingly, the scope of the present invention is to be limited only by the following claims.

What is claimed is:

1. An apparatus for automatically ejecting and transferring a processed workpiece from a tool, said apparatus comprising:

a base;

a cylinder attached to said base, said cylinder having one end retracted in said cylinder and an opposite end extending therefrom;

a pair of cam plates pivotably connected to said opposite end of said piston rod, said pair of cam plates having a plurality of slots adapted to translate said pair of cam plates in response to the initial extension of said piston rod and thereafter rotate said pair of cam plates in response to further extension of said piston rod; and means for engaging said workpiece, said engaging means rigidly mounted to said pair of cam plates, said engaging means adapted to engage said processed workpiece and to transfer said processed workpiece whereby an operator can immediately thereafter load a new workpiece into said tool and the overall cycle time of the operation is reduced.

2. The apparatus of claim 1 further comprising means for temporarily holding said workpiece, said temporary holding means attached to said base and spaced a predetermined distance from said pair of cam plates.

3. The apparatus of claim 2 further comprising a pair of fixed rollers each disposed within one of said plurality of slots of one of said pair of cam plates.

4. The apparatus of claim 3, wherein said piston rod further comprises a pair of drive rollers each disposed within another of said plurality of slots of one of said pair of cam plates.

5. The apparatus of claim 1, wherein said cylinder is pneumatically actuated.

6. The apparatus of claim 1, wherein said cylinder is hydraulically actuated.

7. The apparatus of claim 1, wherein said workpiece engagement portion is configured according to each specific application such that said workpiece engagement portion is adapted to clear any tooling structure and thereby engage said processed workpiece without interference.

8. An apparatus for automatically ejecting and transferring a processed workpiece from a tool, said apparatus comprising:

a base;

a cylinder attached to said base, said cylinder having one end retracted in said cylinder and an opposite end extending therefrom;

a pair of cam plates pivotably connected to said opposite end of said piston rod, said pair of cam plates having a plurality of slots adapted to translate said pair of cam plates in response to the initial extension of said piston rod and thereafter rotate said pair of cam plates in response to further extension of said piston rod;

means for temporarily holding said workpiece, said temporary holding means attached to said base and spaced a predetermined distance from said pair of cam plates;

a workpiece engagement portion rigidly mounted to said pair of cam plates, said workpiece engagement portion being adapted to engage said processed workpiece and to transfer said processed workpiece to said temporary holding means whereby an operator loads a new workpiece while said prior workpiece is loaded into said temporary holding means and thereafter to the next processing station.

9. The apparatus of claim 8 further comprising a pair of fixed rollers each disposed within one of said plurality of slots of one of said pair of cam plates.

10. The apparatus of claim 9, wherein said piston rod further comprises a pair of drive rollers each disposed within another of said plurality of slots of one of said pair of cam plates.

11. The apparatus of claim 8, wherein said cylinder is pneumatically actuated.

12. The apparatus of claim 8, wherein said cylinder is hydraulically actuated.

13. The apparatus of claim 8, wherein said workpiece engagement portion is configured according to each specific application such that said workpiece engagement portion is adapted to clear any tooling structure and thereby engage said processed workpiece without interference.

* * * * *